July 7, 1931.  A. DELORME  1,813,567
NIPPLE EXTRACTOR
Filed May 1, 1930
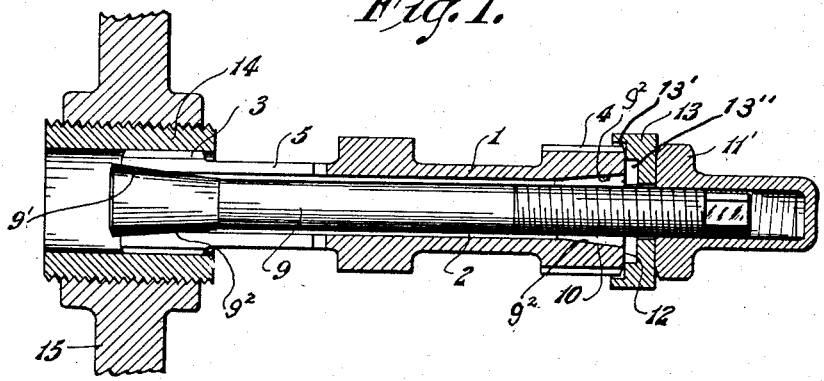
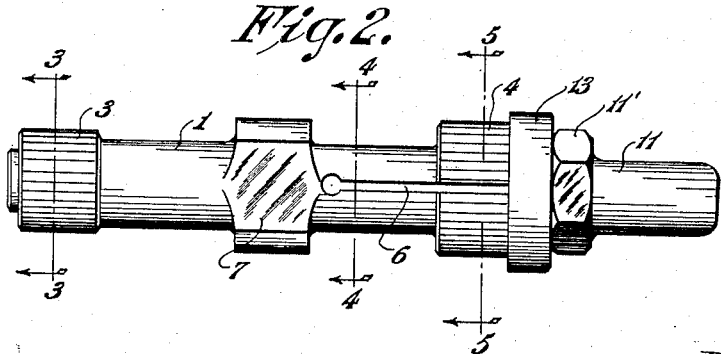
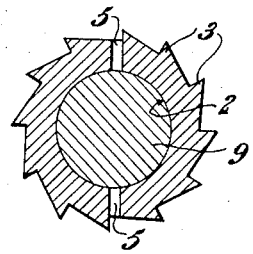
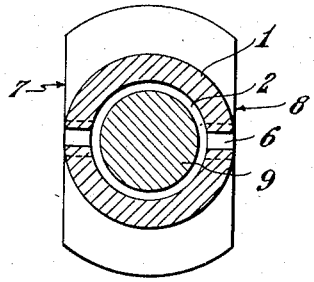
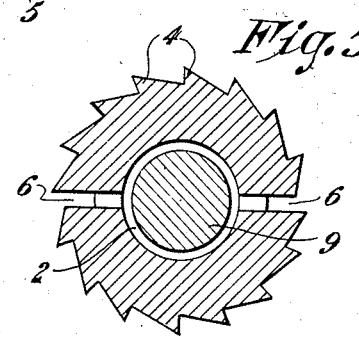
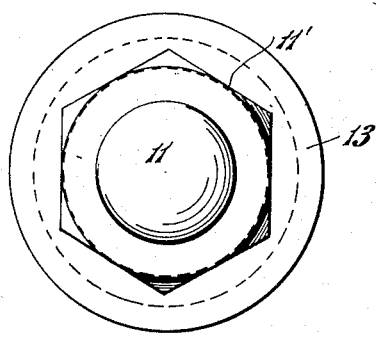
INVENTOR,
Alfred Delorme,
BY
Harry W. Bowen.
ATTORNEY.

Patented July 7, 1931

1,813,567

UNITED STATES PATENT OFFICE

ALFRED DELORME, OF SPRINGFIELD, MASSACHUSETTS

NIPPLE EXTRACTOR

Application filed May 1, 1930. Serial No. 448,905.

This invention relates to improvements in nipple extractors.

An object of the invention is to provide a device for removing a nipple that has become broken or rusted in a threaded opening, and, without mutilating the casting in which it is threaded.

At the present time, it is a common practice, so far as I am aware, to resort to the use of a cold chisel for removing the broken nipple, which usually results in mutilating the casting and oftentimes breaking the same, as for example, in steam radiators, with the result that the entire radiator section must be replaced.

The present invention comprises a member, the opposite ends of which are slitted for a portion of its length. It is formed with an opening extending therethrough to receive a tapered member and having means for drawing, or moving, the tapered member into the opening for expanding either one of the slitted ends. The external surface of these ends is formed with teeth, preferably pointing in a left-hand direction, whereby, when the taper is tightened, the teeth are imbedded into the inner surface of the nipple. Upon the rotation of the member, with a wrench, or other suitable tool, the nipple may be extracted, without breaking the casting or the nipple.

Referring to the drawings:

Fig. 1 is a longitudinal sectional view thru the axis of the member showing the expanding member inserted therein and the teeth of the member in the nipple.

Fig. 2 is an elevational view of the expanding tool removed from the nipple.

Fig. 3 is a sectional view on the line 3—3 of Fig. 2 showing the left-handed shaped teeth and the expanding member.

Fig. 4 is a sectional view on the line 4—4 of Fig. 2 looking in the direction of the arrows, showing the flat surfaces to receive the jaws of a wrench, or other suitable tool.

Fig. 5 is a sectional view on the line 5—5 of Fig. 2 looking in the direction of the arrows showing the expanding member in the extractor, and Fig. 6 is a view looking from the right-hand end of Fig. 2.

Referring to the drawings in detail:

1 designates the body portion of the extractor member which is formed with an opening 2 extending therethrough and having cone-shaped ends. The opposite ends of the extractor are formed with teeth 3 and 4, which point left-handedly, as shown, in the sectional views of Figs. 3 and 5. Each of the ends of the member is formed with a slit 5 and 6, which are arranged at 90° to each other. Located intermediate the ends of the extractor are two flat and parallel surfaces 7 and 8 for receiving a tool, as a wrench. 9 designates a member that is slightly tapered at one end, as clearly shown by the reference numeral 9', the opposite end of this member being provided with a thread 10 for receiving the internally threaded cap 11, having the faces 11' for receiving a wrench. Located between the cap 11 and the end 12 of the extractor is a plate, or washer-like member 13, which is engaged by the threaded cap during the tightening operations of the tapered member 9. This plate is designed to be used as a protective device on either one of the toothed ends 3 or 4 of the member 1, since the washer-like member 13 is formed with the different sized recesses 13' and 13'', as shown. 14 indicates a nipple, in the casting 15, to be extracted.

The operation of the extractor is as follows: It is assumed that the internal diameter of the nipple 14 is of such a size as to receive the sharp teeth 3. The tapered member 9 is placed in the opening 2 and the cap 11 threaded onto the tapered member for drawing the inclined surface 9' against the cone-shaped inner surface $9^2$ of the opening 2, whereby the teeth 3 are forced or imbedded into the inner surface of the nipple 14. The operator now applies a wrench, or other tool, to the flattened surfaces 7 and 8, and rotates the extractor in a left-handed direction with the result that the nipple is removed from the casting, without mutilating the casting or the nipple.

If the internal diameter of the nipple 14 is larger than that illustrated, the larger teeth 4 on the opposite end are used and the tapered member 9 is inserted in the opposite end of the member 1 for expanding the teeth 4 and the cap 11 rotated to expand the slitted end. It will be seen from this description that I have provided a nipple extractor that is efficient in operation, one that can be readily assembled, when required, for use. It is economical to produce and easy to operate.

What I claim is:

1. A nipple extractor comprising a member formed with an opening therethrough with a cone-shaped surface at one end, said end of the member being slitted for a portion of its length, the extreme outer end surface of the member having teeth which extend in a left-hand direction, a tapered member designed to be inserted in the opening of the member for expanding the slitted end, means for tightening the tapered member in the opening for embedding the teeth into a nipple, or the like, to be extracted, said member having a portion of its intermediate surface formed with parallel surfaces to receive an operating tool, for rotating the member, when a nipple is being extracted.

2. As an article of manufacture, a member formed with a tapered opening through the same and having an end slitted, the outer surface of the member at or near its ends having ratchet-shaped teeth, and means for expanding the slitted end.

3. A nipple extractor comprising a member formed with an opening therethrough and tapered at one end of the opening, the end of said member formed with said taper being also formed with a plurality of slits through its walls and a plurality of axially arranged ratchet-shaped teeth on its external surface, said teeth being faced in such a manner as to grip an engaged surface when said member is revolved in a left hand direction, means in said tapered opening for expanding said end, and oppositely disposed flat surfaces formed intermediate the ends of said member for the purpose of permitting said member to be rotated by a tool in engagement with said surfaces.

4. A nipple extractor comprising a member formed with an opening therethrough with a cone-shaped surface at one end, said end of the member being slitted for a portion of its length, the extreme outer end surface of the member having teeth which extend in a left-hand direction, a tapered member designed to be inserted in the opening of the member for expanding the slitted end, means for tightening the tapered member in the opening for embedding the teeth into a nipple, or the like, to be extracted, a recessed washer-like member extending over the teeth and engaged by the tightening member to prevent mutilating the teeth, said toothed member having a portion of its intermediate surface formed with parallel surfaces to receive an operating tool, for rotating the member, when a nipple is being extracted.

ALFRED DELORME.